United States Patent [19]
Ono

[11] Patent Number: 5,812,298
[45] Date of Patent: Sep. 22, 1998

[54] ASPHERICAL REFLECTOR AND LIGHT BEAM SCANNING OPTICAL SYSTEM USING THE SAME

[75] Inventor: Hiroshi Ono, Ebina, Japan

[73] Assignee: Fuji Xerox Co., Ltd., Tokyo, Japan

[21] Appl. No.: 561,391

[22] Filed: Nov. 21, 1995

[30] Foreign Application Priority Data

Nov. 24, 1994 [JP] Japan ................................ 6-289734
Nov. 24, 1994 [JP] Japan ................................ 6-289735

[51] Int. Cl.[6] .................................................. G02B 26/08
[52] U.S. Cl. ........................ 359/208; 359/205; 359/216; 359/853
[58] Field of Search ................................ 359/205, 208, 359/212, 216–219, 853, 868, 869; 250/234–236; 347/241, 243, 256, 259–261

[56] References Cited

U.S. PATENT DOCUMENTS

| | | | |
|---|---|---|---|
| 4,941,719 | 7/1990 | Hisada et al. ............................ | 359/205 |
| 5,233,454 | 8/1993 | Sakuma et al. . | |
| 5,373,390 | 12/1994 | Sakuma ................................. | 359/208 |
| 5,475,522 | 12/1995 | Itabashi et al. ......................... | 359/208 |
| 5,557,448 | 9/1996 | Endo et al. .............................. | 359/205 |
| 5,583,559 | 12/1996 | Nakamura et al. ..................... | 359/208 |
| 5,684,618 | 11/1997 | Atsuumi ................................. | 359/208 |

FOREIGN PATENT DOCUMENTS

| | | |
|---|---|---|
| 58-63915 | 4/1983 | Japan . |
| 1-200220 | 8/1989 | Japan . |
| 2-15231 | 1/1990 | Japan . |
| 5-164981 | 6/1993 | Japan . |
| 5-341218 | 12/1993 | Japan . |

*Primary Examiner*—James Phan
*Attorney, Agent, or Firm*—Oliff & Berridge PLC

[57] ABSTRACT

The reflecting surface of an aspherical reflector assumes, in the main scanning plane, a curve represented by $Z(Y)=AY^2+BY^4+CY^6+DY^8+EY^{10}$ where Z is the coordinate along the optical axis, Y is the coordinate in the direction that is perpendicular to the optical axis and is included in the main scanning plane, and A to E are coefficients satisfying $A \times C > 0$. The reflecting surface assumes, in any of auxiliary scanning planes arranged in the main scanning direction, a circular arc that establishes a conjugate relationship in geometrical optics between the deflecting face of a deflector and the scanning surface.

18 Claims, 11 Drawing Sheets

SCANNING POSITION
ACCURACY (mm)

CURVATURE OF FIELD (mm)

——— MAIN SCANNING DIRECTION
- - - - - AUX. SCANNING DIRECTION

SCANNING POSITION
ACCURACY (mm)

CURVATURE OF FIELD (mm)

——— MAIN SCANNING DIRECTION
- - - - - AUX. SCANNING DIRECTION

SCANNING POSITION
ACCURACY (mm)

CURVATURE OF FIELD (mm)

——— MAIN SCANNING DIRECTION
- - - - - AUX. SCANNING DIRECTION

SCANNING POSITION
ACCURACY (mm)

CURVATURE OF FIELD (mm)

——— MAIN SCANNING DIRECTION
----- AUX. SCANNING DIRECTION

SCANNING POSITION
ACCURACY (mm)

CURVATURE OF FIELD (mm)

——— MAIN SCANNING DIRECTION
----- AUX. SCANNING DIRECTION

SCANNING POSITION ACCURACY (mm)

CURVATURE OF FIELD (mm)

——— MAIN SCANNING DIRECTION
------ AUX. SCANNING DIRECTION

SCANNING POSITION ACCURACY (mm)

CURVATURE OF FIELD (mm)

——— MAIN SCANNING DIRECTION
------ AUX. SCANNING DIRECTION

SCANNING POSITION ACCURACY (mm)

CURVATURE OF FIELD (mm)

——— MAIN SCANNING DIRECTION
------ AUX. SCANNING DIRECTION

CURVATURE OF FIELD (mm)

CURVATURE OF FIELD (mm)
(MAIN SCANNING DIRECTION)

CURVATURE OF FIELD (mm)
(AUX. SCANNING DIRECTION)

SCANNING POSITION ACCURACY (mm)

CURVATURE OF FIELD (mm)
(MAIN SCANNING DIRECTION)

CURVATURE OF FIELD (mm)
(AUX. SCANNING DIRECTION)

SCANNING POSITION ACCURACY (mm)

CURVATURE OF FIELD (mm)
(MAIN SCANNING
DIRECTION)

CURVATURE OF FIELD (mm)
(AUX. SCANNING
DIRECTION)

SCANNING POSITION
ACCURACY (mm)

CURVATURE OF FIELD (mm)
(MAIN SCANNING
DIRECTION)

CURVATURE OF FIELD (mm)
(AUX. SCANNING
DIRECTION)

SCANNING POSITION
ACCURACY (mm)

CURVATURE OF FIELD (mm)
(MAIN SCANNING DIRECTION)

CURVATURE OF FIELD (mm)
(AUX. SCANNING DIRECTION)

SCANNING POSITION ACCURACY (mm)

CURVATURE OF FIELD (mm)
(MAIN SCANNING DIRECTION)

CURVATURE OF FIELD (mm)
(AUX. SCANNING DIRECTION)

SCANNING POSITION ACCURACY (mm)

ASPHERICAL REFLECTOR AND LIGHT
BEAM SCANNING OPTICAL SYSTEM
USING THE SAME

BACKGROUND OF THE INVENTION

1. Field of the Invention

The present invention relates to a light beam scanning optical system used in a laser printer, a digital copier, etc., and an aspherical reflector used in the above light beam scanning optical system.

2. Description of the Related Art

Conventionally, the polygon mirror capable of high-speed scanning is mainly used as a deflector of a light beam scanning optical system that is used in a laser beam printer, a digital copier, etc. Since the deflection by the polygon mirror is performed at a constant angular velocity, constant speed scanning is attained on a circular locus about the deflection point. However, on a scanning surface that is straight in the main scanning direction as in the case of a drum-like photoreceptor, the scanning speed at the center of scanning in the main scanning direction is different than at both ends, resulting in image distortion. To solve this problem, an fθ lens is conventionally used which effects such correction as allows constant-speed scanning on the scanning surface.

However, the fθ lens, which generally consists of a plurality of lenses, is expensive if glass lenses produced by polishing are used. To reduce the processing cost, an fθ lens produced by plastic molding is now put into practical use.

However, variations in shape and refractive index of plastics due to an environmental change such as a temperature or humidity variation are larger than those of glass. For example, if there occurs a temperature variation of about 40°, which is expected in actual use, an fθ lens using plastic lenses would cause a variation of the overall scanning length, which results in a non-negligible elongation or contraction of an image. Such deteriorations of optical characteristics occur mostly due to a refractive index variation. That is, while aspherical lenses (i.e., an fθ lens) can be constructed at a low cost by making those with plastics, they have a non-negligible environment dependence that originates from their optical properties and unavoidably suffer from variations of optical characteristics. Thus, plastic aspherical lenses can be applied to only a limited range of use.

Plastic lenses are disadvantageous also in the surface accuracy, which affects image forming characteristics. In general, a lens has a variable thickness profile in which the thickness in the light beam transmission direction varies with the transmission position. Therefore, the cooling rate in a molding process likely varies, which makes it very difficult to secure high surface accuracy.

The above problems can be solved by employing a concave reflector, which enables a uniform, thin part design because it does not transmit a light beam. Conventionally, various techniques have been proposed which use, instead of an fθ lens, a concave reflector having a function of equalizing the scanning speed on a scanning surface. The technique of Japanese Unexamined Patent Publication No. Hei. 1-200220 uses a spherical mirror. The technique of Japanese Unexamined Patent Publication No. Hei. 5-341218 uses a coaxial aspherical reflector. Japanese Unexamined Patent Publication No. Hei. 5-164981 discloses a technique of using a reflector having a concave, barrel-shaped surface that is formed by rotating a non-circular arc defined in the main scanning plane about an axis that exists in the main scanning plane and crosses the optical axis.

However, in the technique of the publication Hei. 1-200220 using a spherical mirror, in which the reflecting surface is symmetrical with respect to the optical axis, the power in the main scanning direction is the same as that in the auxiliary scanning direction. When a polygon mirror is used as a deflector, an anamorphic optical element needs to be provided separately from the spherical mirror to establish a conjugate relationship in geometrical optics between the polygon mirror reflecting face and the scanning surface to correct for a phenomenon (called "face inclination") that the angle formed by the normals to the respective polygon mirror reflecting faces and the rotation axis vary from one face to another due to working errors and mounting errors. This not only increases the number of parts but also complicates the apparatus. Further, this sets a certain limitation on the cost reduction. In addition, because of the spherical reflecting surface, the degree of freedom of the optical design is low, so that the curvature of field and the fθ characteristic cannot be corrected sufficiently.

The technique of the publication Hei. 5-341218 using a coaxial aspherical reflector corrects the curvature of field and the fθ characteristic by means of the aspherical reflector. To correct both of the curvature of field in the main scanning direction and that in the auxiliary scanning direction by a coaxial aspherical surface symmetrical to the optical axis, the aspherical reflector needs to be disposed on the scanning surface side of the middle point between the deflection point and the scanning surface. Since the curvature of field in the auxiliary scanning direction is corrected more properly by disposing the aspherical reflector closer to the scanning surface, to properly correct both of the curvature of field and the fθ characteristic, the aspherical reflector needs to be disposed immediately before the scanning surface. However, in an optical system using a reflector, a light beam separating means such as a path-folding mirror or a half mirror needs to be provided between the aspherical reflector and the scanning surface to separate a light beam entering the reflector and a light beam reflected therefrom. Therefore, it is difficult to implement a configuration for satisfactorily correcting the curvature of field in the auxiliary scanning direction. Further, since the use of the coaxial aspherical surface prohibits establishment of a conjugate relationship in geometrical optics between the deflection point and the scanning surface, the unevenness in the pitch of scanning lines cannot be corrected when a deflector having a plurality of reflecting faces such as a polygon mirror is used.

The technique of the publication Hei. 5-164981 can correct both of the optical characteristics and errors due to the face inclination only by the reflector. However, since the reflecting surface is rotation-symmetrical, once the reflecting surface shape in the main scanning direction and the position of the reflector for properly correcting the optical characteristics in the main scanning direction and the position of the rotation axis of a non-circular arc for establishing a conjugate relationship between the reflecting face of the deflector and the scanning surface are determined, the radius of curvature in the auxiliary scanning plane in a central portion of the reflector and that in end portions thereof are also determined. Thus, this technique is disadvantageous in that the degree of freedom in determining the reflecting surface shape is low, which in turn sets a limitation on the correction of the curvature of field in the auxiliary scanning direction.

In the technique of the publication Hei. 5-164981 using a reflector having a concave, barrel-shaped surface formed by rotating a non-circular arc, the optical characteristics and errors due to the face inclination can be corrected only by the reflector. However, since the reflecting surface is rotation-symmetrical, there is a limitation on the position of the aspherical reflector for providing satisfactory optical characteristics. More specifically, since a non-circular arc defined in the main scanning plane is rotated with a radius of curvature that is required to establish a conjugate relationship in geometrical optics between the deflection point and the scanning surface, the image forming scheme in the main scanning direction and that in the auxiliary scanning direction cannot be determined independently. The curvature of field and the fθ characteristic in the main scanning direction and that in the auxiliary scanning direction can be corrected satisfactorily only when the aspherical reflector is disposed in a central portion between the deflection point and the scanning surface. If the aspherical reflector is disposed closer to the deflector, the correction of the curvature of field in the auxiliary scanning direction becomes insufficient. If it is disposed closer to the scanning surface, the correction of the curvature of field in the auxiliary scanning direction becomes excessive. Further, the non-circular arc in the main scanning plane is one represented by conical constants, higher-order aspherical coefficients cannot be determined independently, which imposes a limitation on the correction of the curvature of field and the fθ characteristic in the main scanning direction.

SUMMARY OF THE INVENTION

The present invention has been made in view of the above-described problems in the prior art, and therefore has an object of providing a light beam scanning optical system which, in spite of having only an aspherical reflector as a converging optical element between a deflector and a scanning surface, can properly correct the optical characteristics in the main and auxiliary scanning directions irrespective of where the aspherical reflector is disposed and has a function of correcting the face inclination of a polygonal mirror, thereby enabling high-density light beam scanning.

Another object of the invention is to provide a light beam scanning optical system in which it is less likely that the optical characteristics are deteriorated due to environmental changes even where an aspherical reflector is formed with plastics in favor of its low-cost processing.

A further object of the invention is to provide a light beam scanning optical system in which the unevenness of the pitch of scanning lines is less likely to occur even where a plastic polygon mirror is used as a deflector and therefore errors due to the face inclination are large.

According to a first aspect of the invention, the reflecting surface of an aspherical reflector assumes, in the main scanning plane including the optical axis, a curve represented by $$Z(Y)=AY^2+BY^4+CY^6+DY^8+EY^{10} \quad (1)$$

where Z is a coordinate along the optical axis, Y is a coordinate in a direction that is perpendicular to the optical axis and is included in the main scanning plane, and A to E are coefficients. With this configuration, the curve in the main scanning plane can be shaped independently in a portion close to the optical axis and in end portions, which allows proper correction of the converging position of a deflected light beam in the main scanning plane and the scanning speed invariability.

A detailed discussion will be made of the relationship between the aspherical coefficients in Equation (1) and the curvature of field in the main scanning direction and the scanning position accuracy. The scanning position accuracy means the difference between the ideal and actual scanning positions at an arbitrary deflection angle. The ideal scanning position at an arbitrary deflection angle is determined proportionally using as a reference an image height (distance on the scanning surface between the center of scanning to a position where a light beam reaches) for the maximum deflection angle.

FIG. 14 is a graph showing an example of correction effects of the aspherical coefficients, i.e., variations of optical characteristics when the second-order, fourth-order, and sixth-order coefficients are varied from 0. The horizontal axis and the vertical axis represent the curvature of field and the scanning position accuracy, respectively. The origin of the graph corresponds to the ideal correction state.

It is understood from the graph that both of the curvature of field in the main scanning direction and the scanning position accuracy vary with the variations of the second-order, fourth-order, and sixth-order aspherical coefficients. Since the second-order coefficient A and the fourth-order coefficient B have orthogonal correction effects, the curvature of field in the main scanning direction and the scanning position accuracy can be corrected at the same time by properly selecting A and B. Further, a study of the effects of the sixth-order aspherical coefficient C has revealed that the coefficient C has a function of correcting errors in optical characteristics that remain after the coefficients A and B are properly selected.

Thus, the curvature of field in the main scanning direction and the scanning position accuracy can be corrected successfully by properly selecting the aspherical coefficients A, B and C. It goes without saying that the eighth-order coefficient D and the tenth-order coefficient E, and coefficients of further higher orders may be added.

A study of the conditions that are required for the aspherical coefficients A, B and C to satisfactorily correct the curvature of field in the main scanning direction and the scanning position accuracy has revealed that the second-order coefficient A and the sixth-order coefficient C should have the same sign, that is, they should satisfy a relationship $A \times C > 0$.

If they have opposite signs, the balance between the correction of the curvature of field in the main scanning direction and the scanning position accuracy is lost, to make it difficult to attain the object.

According to a second aspect of the invention, the reflecting surface of an aspherical reflector assumes, in the main scanning plane, a curve represented by $$Z(Y)=cY^2/[1+\{1-(K+1)c^2Y^2\}^{1/2}]+BY^4+CY^6+DY^8+EY^{10} \quad (4)$$

where c is a radius of curvature on the optical axis in the main scanning plane, and K, B, C, D and E are aspherical coefficients.

In addition to the reflecting surface shape for properly correcting the optical characteristics in the main scanning plane, the reflecting surface shape for properly correcting the converging position in the auxiliary scanning direction is determined as follows. That is, the reflecting surface assumes, in the auxiliary scanning plane, a curve defined by a radius of curvature in the auxiliary scanning lane which is represented by $$R(Y)=a_0+a_2Y^2+a_4Y^4+a_6Y^6 \quad (2)$$

where $a_0$ to $a_6$ are coefficients, and the reflecting surface is represented by $$Z(X, Y)=Z(Y)+R(Y)-\{R(Y)^2-X^2\}^{1/2} \quad (3)$$

where X is a coordinate in a direction perpendicular to the main scanning plane.

Since the radius R(Y) of curvature in an auxiliary scanning plane at any position in the main scanning direction can be determined arbitrarily, a conjugate relationship in geometrical optics between the deflection point and the scanning surface can be established for any deflection angle. This enables correction of scanning line unevenness on the scanning surface due to inclination of reflecting faces of a deflector.

As is understood from Equation (3), it becomes possible to independently determine the reflecting surface shapes in the main and auxiliary scanning planes, which in turn enables successful correction of all of the curvature of field in the main and auxiliary scanning directions and the scanning position accuracy.

According to the invention, a light beam scanning optical system is provided which uses the above aspherical reflector and an optical system capable of forming a line image is disposed between a light source and a deflector. This light beam scanning optical system can realize the required optical characteristics. A light beam scanning optical system for canning a scanning surface such as a photoreceptor is constructed by further providing a means for separating a path of a deflected light beam entering the aspheric reflector and a path of a light beam reflected therefrom.

In this light beam scanning optical system, it is necessary that a relationship $$0.3<L_m/L_0<0.7$$

be satisfied, where $L_m$ is the distance between the deflection point and the aspherical reflector and $L_0$ is the distance between the deflection point and the scanning surface. If $L_m/L_0$ is smaller than 0.3, the interval between the deflector and the aspherical reflector is too small to assure proper incidence of a light beam onto the deflector. If $L_m/L_0$ is larger than 0.7, the interval between the aspherical reflector and the scanning surface is too small to properly introduce a light beam that is reflected from the aspherical reflector to the scanning surface.

To satisfactorily correct the scanning position accuracy, a relationship $$1.25<1/(2|A|Y_0)-2.43(L_m/L_0)<1.53$$

needs to be satisfied, where $Y_0$ is the distance on the scanning surface between the center of scanning to the end thereof. If the above parameter is larger than 1.53, the negative scanning position error becomes too large. If it is smaller than 1.25, the positive scanning position error becomes too large. In either case, the scanning position accuracy is deteriorated.

As for the condensing state of a light beam as output from the optical system disposed between the light source and the deflector, in the paraxial (optical axis) image forming scheme, converging positions of light beams incident on the scanning surface and the reflecting face of the deflector are in a conjugate relationship in geometrical optics. Therefore, even if the distance between the reflection point (deflection point) of a deflection angle 0° and the aspherical reflector and the distance between the reflection point of a deflection angle 0° and the scanning surface are fixed, the converging position of a light beam reflected by the reflecting face of the deflector is changed by changing the radius of curvature on the optical axis of the aspherical reflector. Therefore, either a convergent light beam or a divergent light beam may be used.

Where a convergent light beam is incident on the reflecting face of the deflector, the curvature of field in the main scanning direction is smaller, resulting in improved uniformity of the scanning spot diameter at scanning positions.

Where a light beam incident on the reflecting face of the deflector is made divergent, the aspherical reflector is disposed closer to the deflector. In this case, not only the aspherical reflector but also the effective diameter of the optical system disposed between the light source and the deflector can be made smaller. This allows use of a less expensive lens system with a relaxed requirement for the spherical aberration.

Where the light beam scanning optical system employs an aspherical reflector in which the non-circular arc in the main scanning plane is a parabola, it is desired that conditions $$0.3<L_m/L_0<0.5, \text{and}$$

$$0.25<L_m/R_t<0.35$$

be satisfied, where $L_m$ is a distance between a deflection point having a deflection angle 0° of the deflector and the aspherical reflector, $L_0$ is a distance between the deflection point having the deflection angle 0° and the scanning surface, and $R_t$ is a radius of curvature of the aspherical reflector on the optical axis in the main scanning plane. If $L_m/L_0$ is smaller than 0.3, the interval between the deflector and the aspherical reflector is too small to assure proper incidence of a light beam onto the deflector. If $L_m/L_0$ is larger than 0.5, the interval between the aspherical reflector and the scanning surface is too small to properly introduce a light beam that is reflected from the aspherical reflector to the scanning surface. If $L_m/R_t$ is smaller than 0.25, the negative curvature of field becomes too large. If $L_m/R_t$ is larger than 0.35, the positive curvature of field becomes too large. In either case, the scanning position accuracy is deteriorated.

As for the material of the aspherical reflector, even if plastic molding is employed as a processing method of the aspherical reflector to reduce the processing cost, deteriorations of the optical characteristics due to a temperature variation are small because a light beam does not pass through the reflector and therefore receives no influence of a refractive index variation. Since only one side of the aspherical reflector is used, the surface of the opposite side is not restricted in terms of the accuracy and shape. Therefore, by approximately equalizing the shapes of the two surfaces, the thickness of the reflector becomes uniform over the entire surfaces, which enables highly accurate processing. Further, by forming the aspherical reflector with a material (e.g., amorphous polyolefin) superior in resistance to moisture absorption, deformation of the optical surface shape due to its nonuniform expansion that is caused by a difference in moisture absorption rate resulting from presence/absence of a reflecting film. This enables provision of a light beam scanning optical system superior in resistance to environmental variations.

As for the material of the deflector, to realize an inexpensive light beam scanning optical system, it is effective to form an optical element with plastics. However, where a polygon mirror is formed by plastic molding, in which case a plurality of reflecting faces are formed simultaneously, there naturally occurs differences in processing accuracy among the plurality of reflecting faces. This is in contrast to the case of a aluminum polygon mirror, in which the reflecting faces are cut individually. FIG. 21 shows an off-axis relationship between the conjugate relationship and the curvature of field. As is understood from FIG. 21, even if a face inclination error correcting optical system that establishes a conjugate relationship between the reflecting face of the deflector and the scanning surface in the auxiliary scanning direction on the paper surface of FIG. 21, a large face inclination δ of the polygon mirror causes an error on the scanning surface that is proportional to the inclination δ if there remains curvature of field in the auxiliary scanning direction. This lowers the ability of correcting the unevenness of the pitch of scanning lines.

By using the aspherical reflector in which radii of curvature in auxiliary scanning planes located along the main scanning direction can be set arbitrarily to realize an almost complete conjugate relationship, the unevenness of the pitch of scanning lines on the scanning surface can be suppressed into a tolerable range even where the deflector is a plastic polygon mirror having a large face inclination. This enables provision of an inexpensive light beam scanning device.

BRIEF DESCRIPTION OF THE DRAWINGS

FIGS. 4A and 4B through FIGS. 13A and 13B are graphs showing the scanning position accuracy and the curvature of field;

DESCRIPTION OF THE PREFERRED EMBODIMENTS

Aspherical reflectors and light beam scanning optical systems according to embodiments of the present invention will be hereinafter described.

Figure 1:
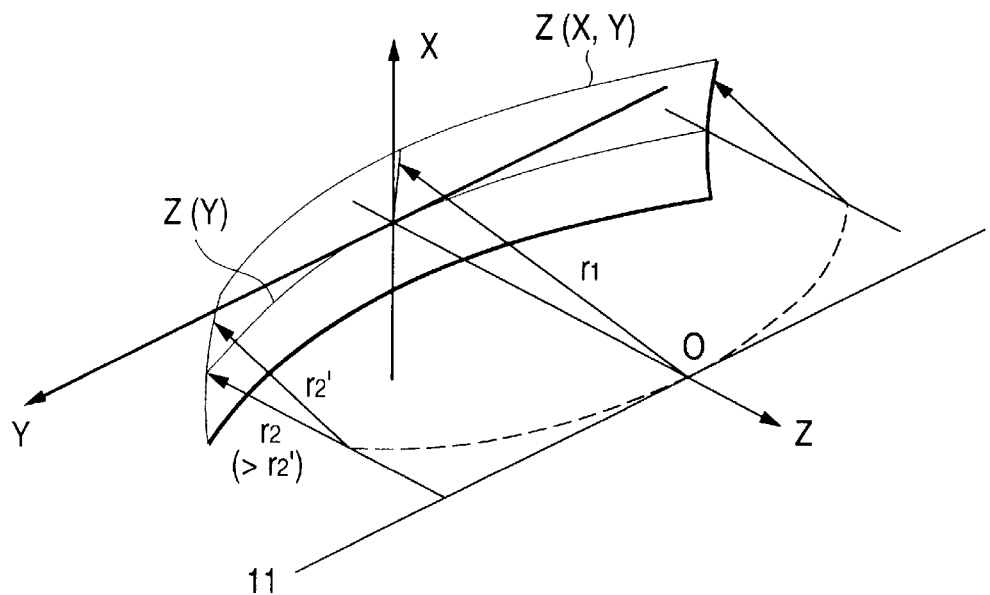
FIG. 1 is a perspective view showing an aspherical reflector according to the present invention.

FIG. 1 shows a reflecting surface shape of an aspherical reflector according to an embodiment of the invention. Orthogonal coordinate axes X, Y and Z are defined as shown in FIG. 1, in which the Z-axis corresponds to the optical axis and the YZ-plane corresponds to the main scanning plane.

A non-circular arc Z(Y) is defined in the YZ-plane so as to correct the curvature of field and the scanning position accuracy. In an auxiliary scanning plane parallel with the optical axis, i.e., in a plane parallel with the XZ-plane, the aspherical reflector is defined as a concave circular arc that provides a conjugate relationship in geometrical optics between the reflecting face of a deflector and the scanning surface for any deflection angle.

To establish a conjugate relationship in geometrical optics between the deflection point and the scanning surface for any deflection angle, the reflecting surface needs to be a smooth surface that does not impair the focusing characteristic and the radius of curvature of a circular arc in an auxiliary scanning plane at an arbitrary position along the Y-axis needs to be given an optimum value.

Where the aspherical reflecting surface is formed by rotating the above non-circular arc Z(Y) (defined in the main scanning plane) about a rotation symmetry axis 11 that is parallel with the Y-axis and passes, on the optical axis, through the center O of curvature of a circular arc (indicated by a dashed line in FIG. 1) that establishes a conjugate relationship in geometrical optics between the deflection point and the scanning surface, the radius of curvature of an auxiliary scanning surface parallel with the optical axis is $r_1$ on the optical axis and $r_2$ at the ends where $r_1 > r_2$. However, with this rotation-symmetrical aspherical surface, the shapes in the main and auxiliary scanning planes cannot be determined independently. That is, it is necessary to sacrifice either of the optical characteristics in the main scanning plane or those in the auxiliary scanning plane, or to equally allocate correction amounts to the scanning planes.

In view of the above, to enable independent corrections of the optical characteristics in the main and auxiliary scanning planes, the shape in the main scanning plane needs to be defined as an equation not including X and the shape in the auxiliary scanning plane needs to be defined as a function of only Y. According to a first embodiment of the invention, this type of aspherical reflecting surface may be realized such that the non-circular arc Z(Y) in the main scanning direction is defined as $$Z(Y) = AY^2 + BY^4 + CY^6 + DY^8 + EY^{10} \tag{1}$$

where A, B, C, D and E are coefficients, the radius of curvature R(Y) in an auxiliary scanning plane is defined as $$R(Y) = a_0 + a_2 Y^2 + a_4 Y^4 + a_6 \tag{2}$$

where $a_0$, $a_2$, $a_4$ and $a_6$ are coefficients, and the aspherical reflecting surface itself is defined as $$Z(X, Y) = Z(Y) + R(Y) - \{R(Y)^2 - X^2\}^{1/2}. \tag{3}$$

In an example shown in FIG. 1, a radius $r_2'$ of curvature at the ends is set smaller than the radius $r_2$ of curvature that is obtained when the non-circular arc Z(Y) is rotated about the rotation symmetry axis 11. Alternatively, $r_2'$ may be set larger than $r_2$. As a further alternative, $r_2'$ may be set equal to $r_2$ as long as the following relationship holds:

$$0.35 < L_m/L_0 < 0.4$$

where $L_m$ is a distance between the deflection point and the aspherical reflector and $L_0$ is a distance between the deflection point and the scanning surface.

The invention intends to properly correct the curvature of field in the auxiliary scanning direction irrespective of the location of the aspherical reflector by independently determining the circular arc in the auxiliary scanning plane and the non-circular arc in the main scanning direction. In FIG. 1, a locus of the center of curvature of the circular arc in the auxiliary scanning plane is indicated by a dashed line.

Figure 2:
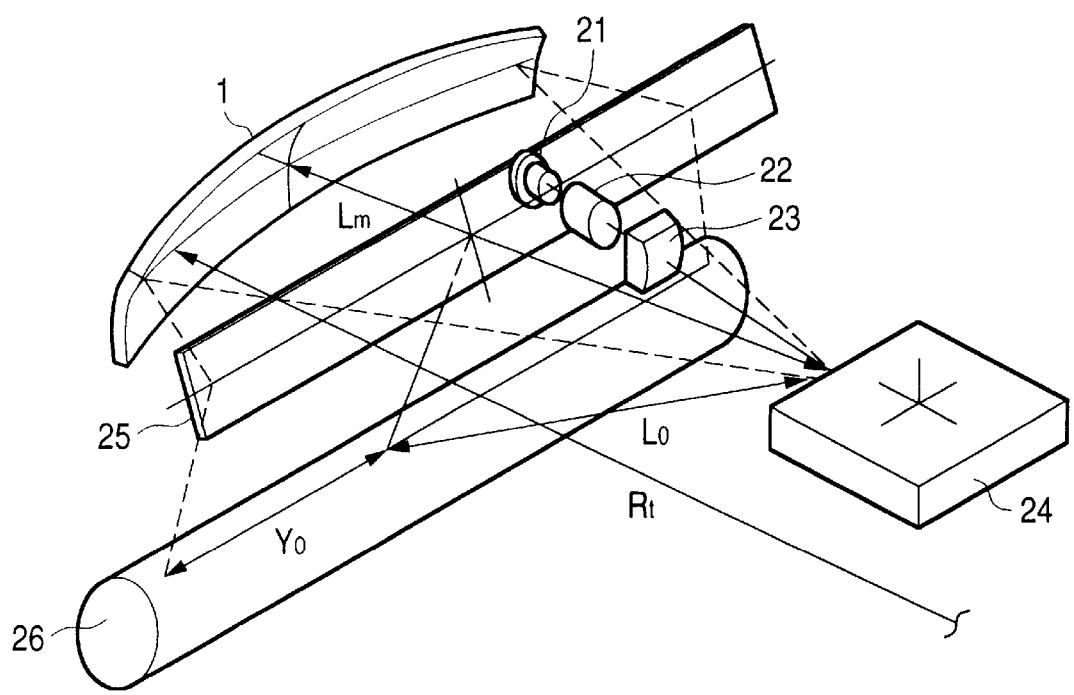
FIG. 2 is a perspective view schematically showing the configuration of a light beam scanning optical system according to the invention.

FIG. 2 shows the configuration of a light beam scanning optical system according to embodiments of the invention. A light beam emitted from a semiconductor laser 21 (light source) is converted into a converging or diverging beam by a condenser lens 22, and formed into a line image parallel with the main scanning plane by a cylindrical lens 23. A polygon mirror 24 (deflector) is so disposed as to have a reflecting face in the vicinity of the line image, and rotated by a scanner motor (not shown) at a constant angular velocity. Thus, the polygon mirror 24 reflects, i.e., deflects the light beam. After passing through a beam splitter 25 that is located between the polygon mirror 24 and the aspherical reflector 1, the deflected light beam is reflected by the aspherical reflector 1 to become a light beam that is focused as a light spot on the scanning surface and used to scan the scanning surface in the main scanning direction. The light beam reflected by the aspherical reflector 1 in the direction opposite to the incident direction is divided into two beams by the beam splitter 25, one of which beams reaches a photoreceptor drum 26 (scanning surface).

Figure 3A:
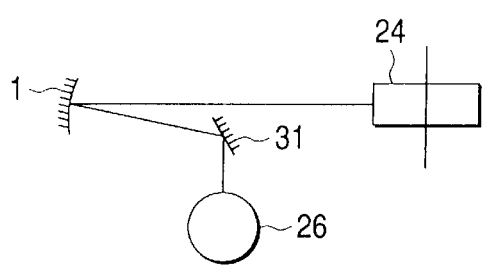
FIGS. 3A and 3B schematically show modified versions of light beam scanning optical systems.
Figure 3B:
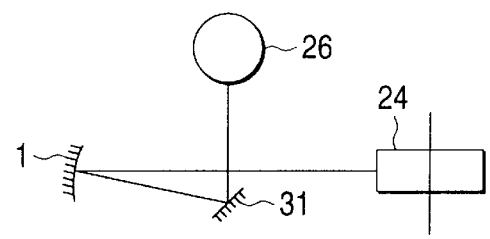
Figure 4A:
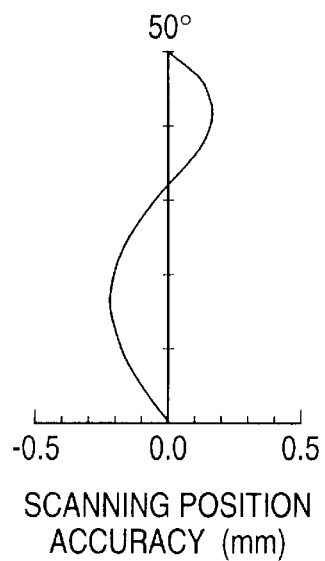
Figure 4B:
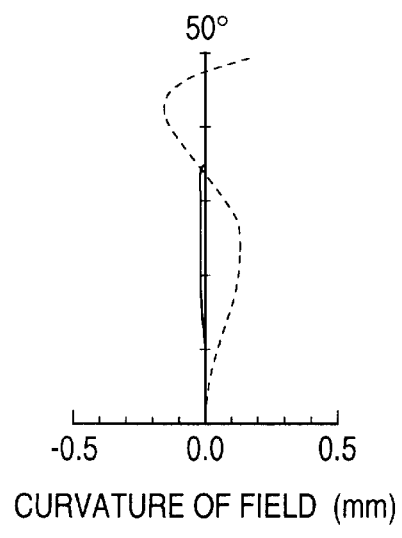
Figure 5A:
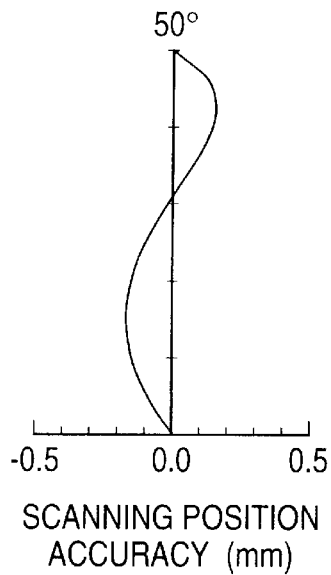
Figure 5B:
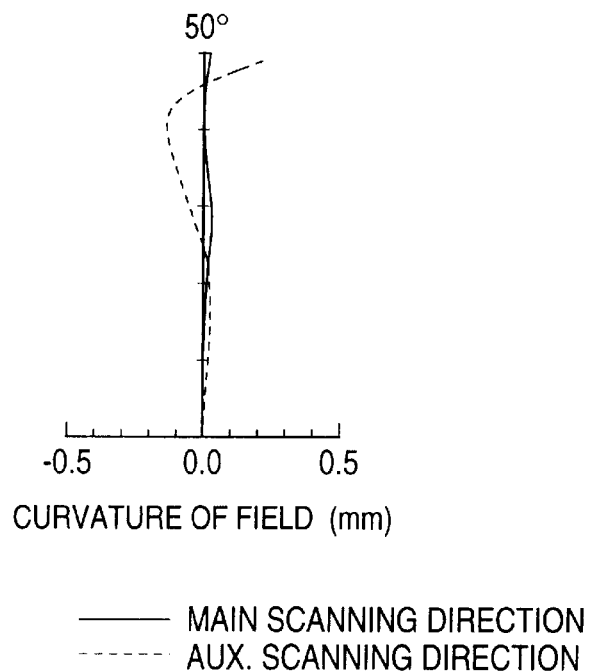
Figure 6A:
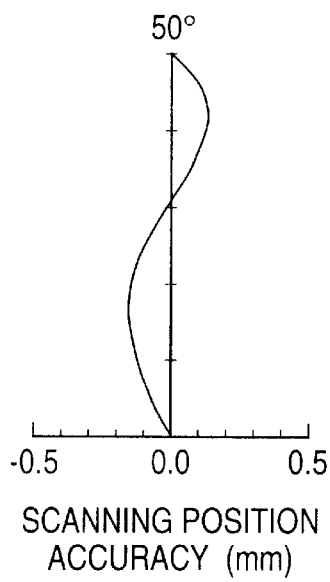
Figure 6B:
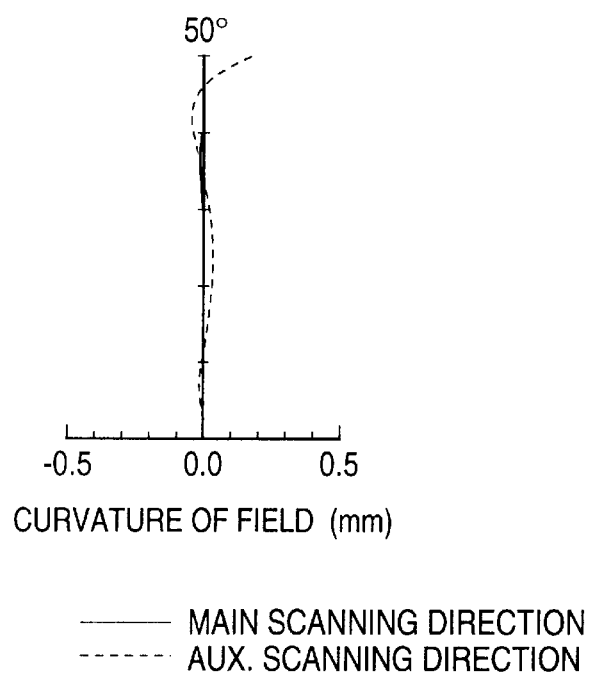
Figure 7A:
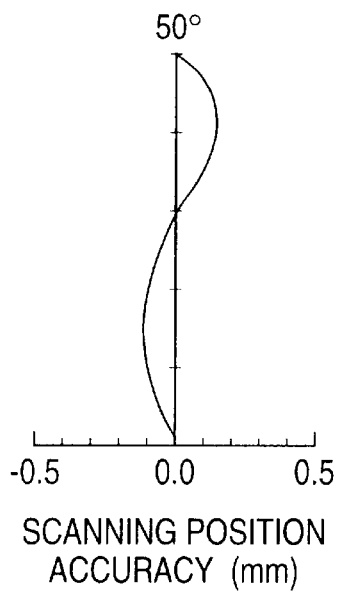
Figure 7B:
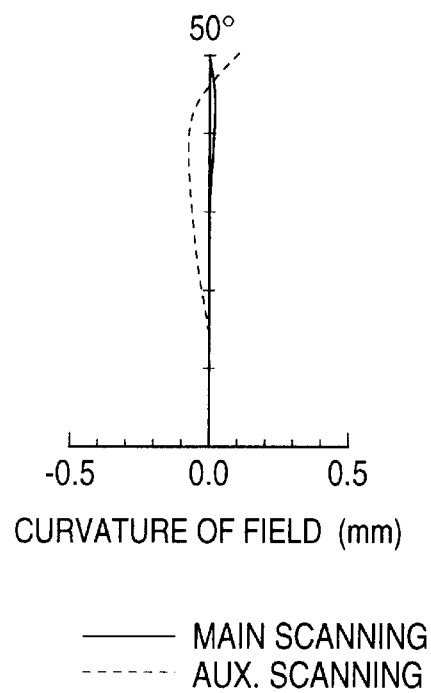
Figure 8A:
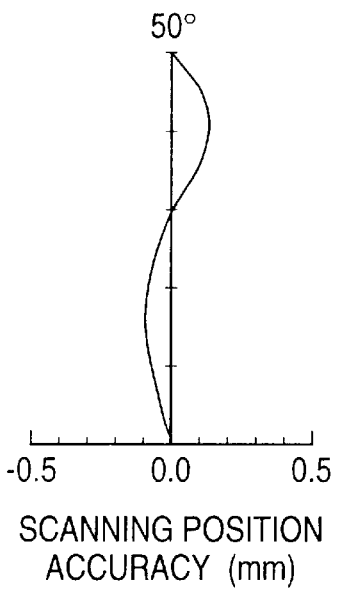
Figure 8B:
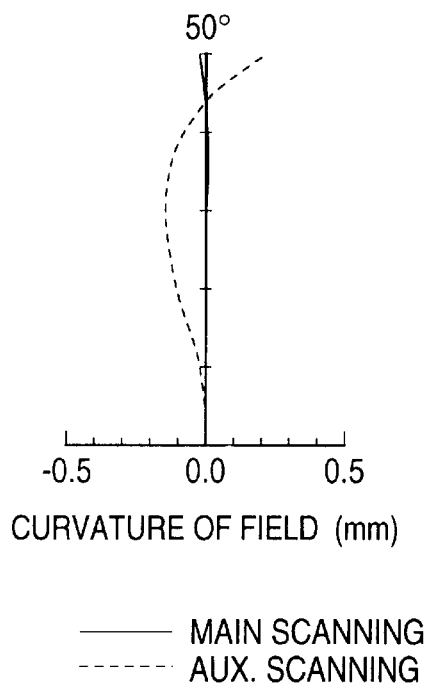
Figure 9A:
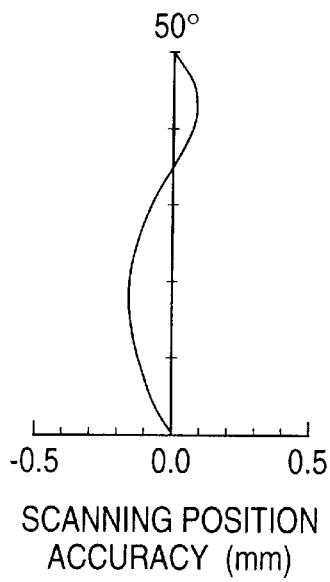
Figure 9B:
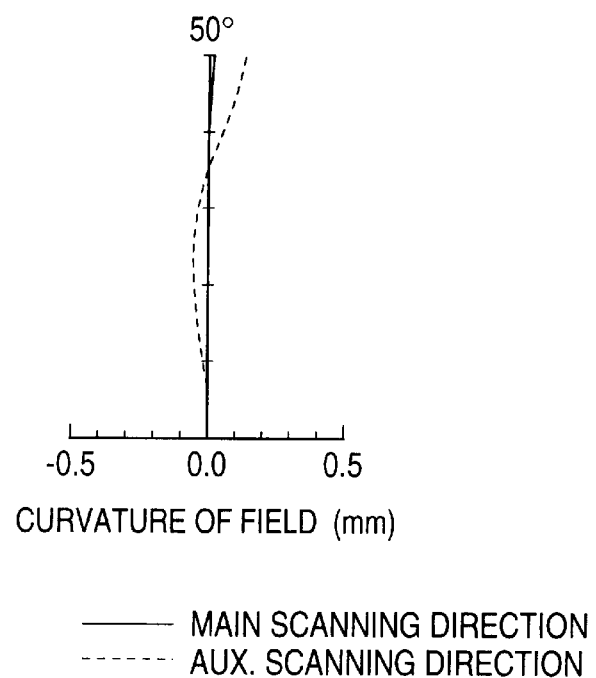
Figure 10A:
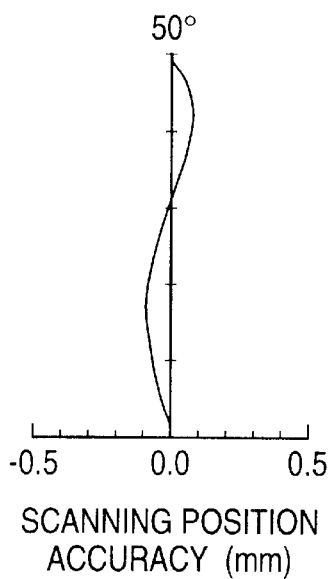
Figure 10B:
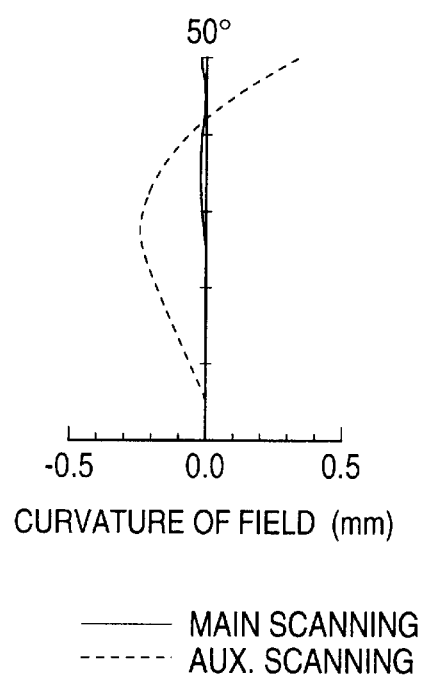
Figure 11A:
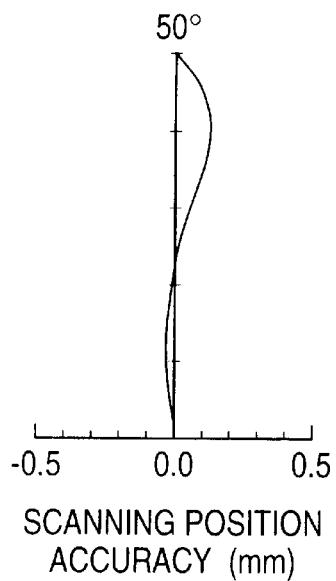
Figure 11B:
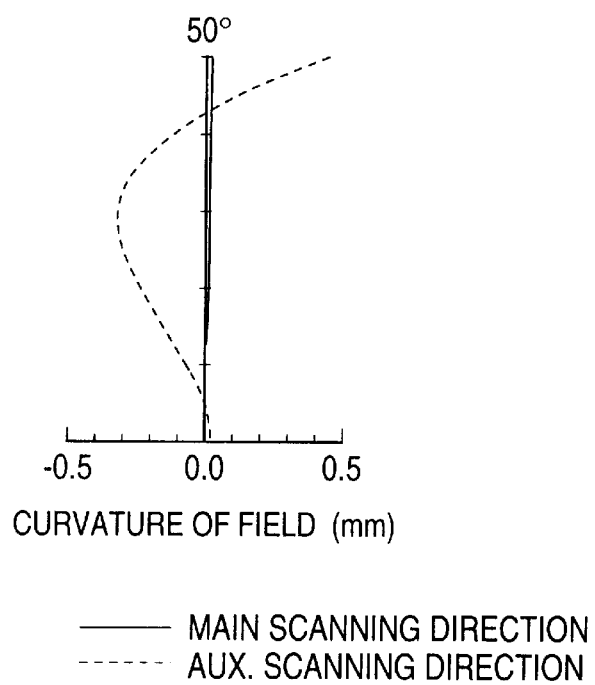
Figure 12A:
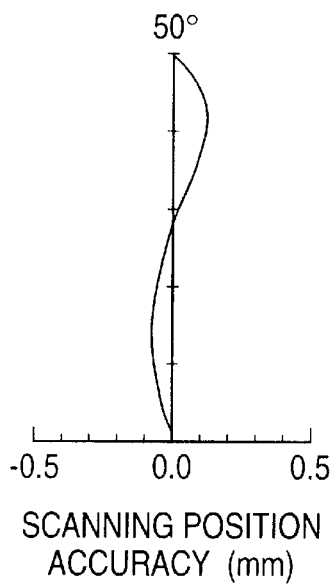
Figure 12B:
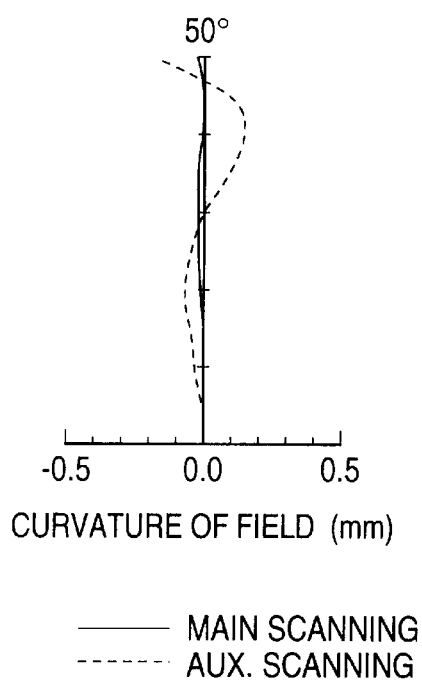
Figure 13A:
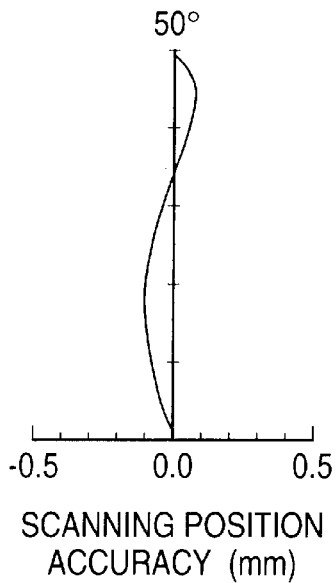
Figure 13B:
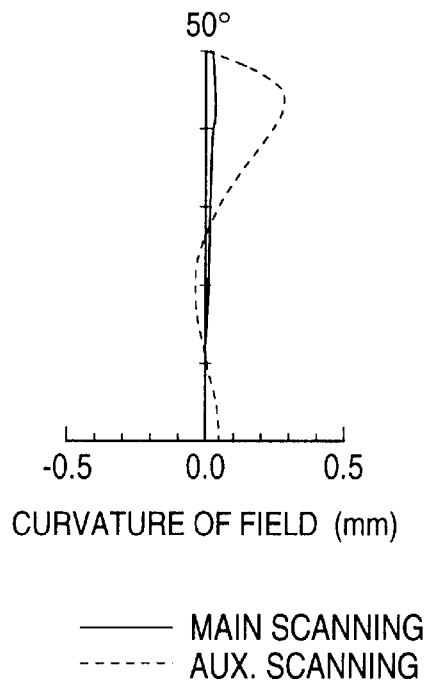
Figure 14:
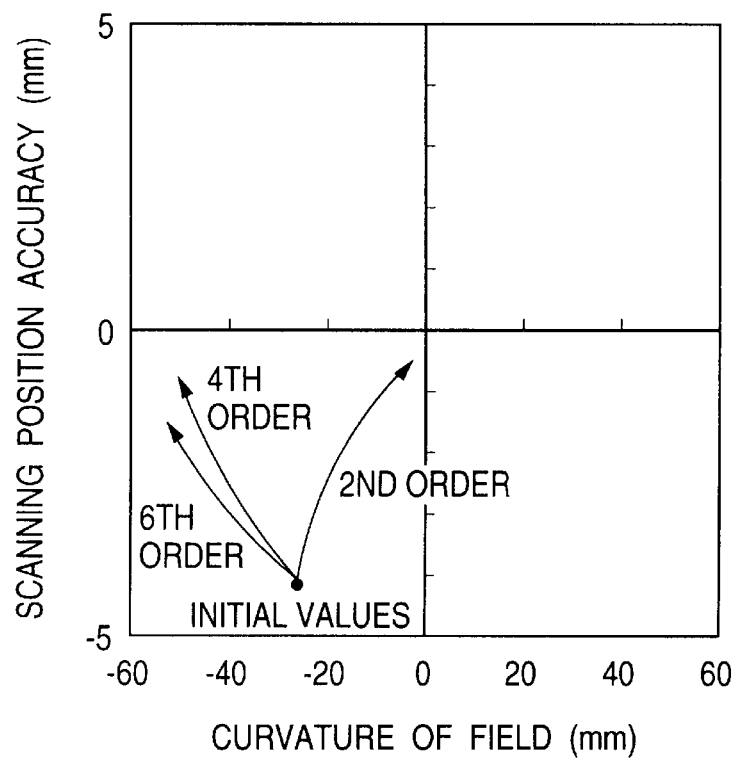
FIG. 14 is a graph showing correction effects of aspherical coefficients.
Figure 15A:
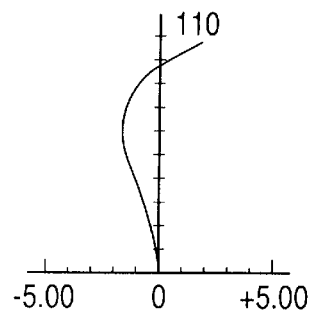
FIGS. 15A and 15C through FIGS. 20A and 20C are graphs showing the curvature of field and the scanning position accuracy.
Figure 15B:
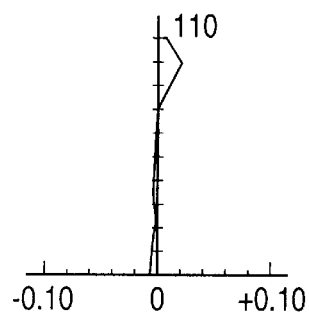
Figure 15C:
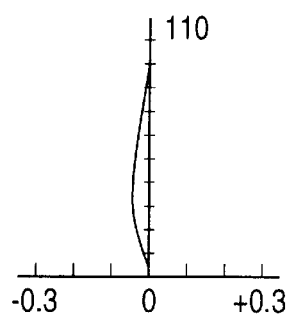
Figure 16A:
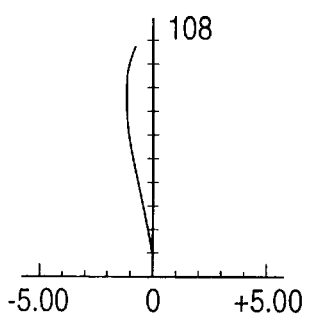
Figure 16B:
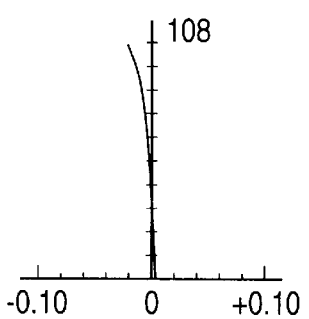
Figure 16C:
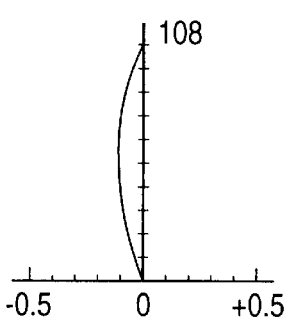
Figure 17A:
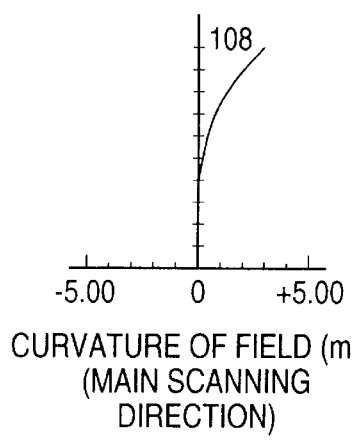
Figure 17B:
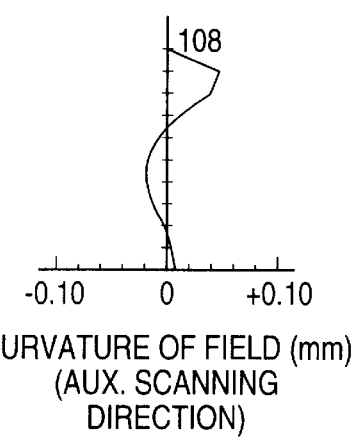
Figure 17C:
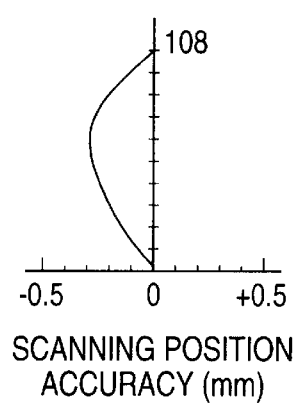
Figure 18A:
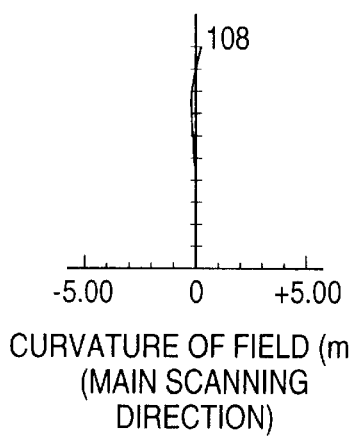
Figure 18B:
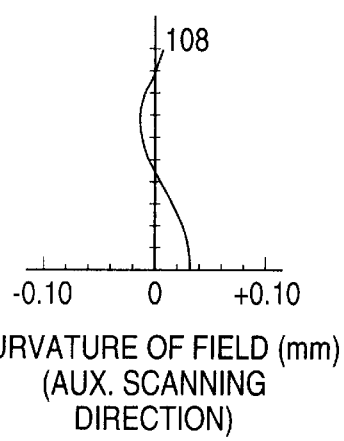
Figure 18C:
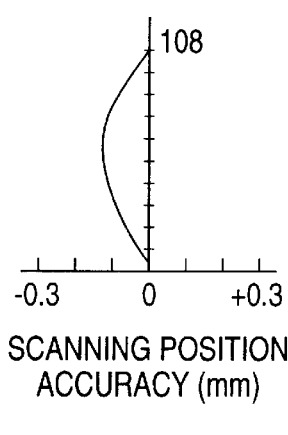
Figure 19A:
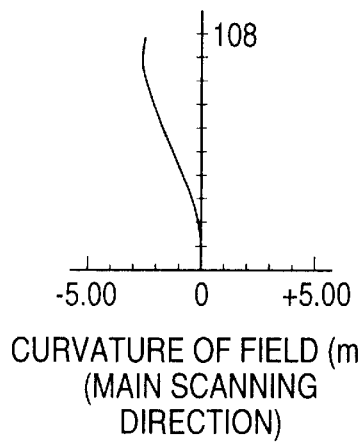
Figure 19B:
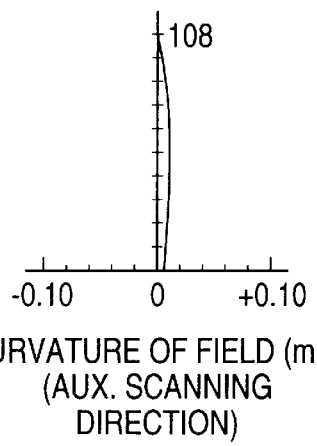
Figure 19C:
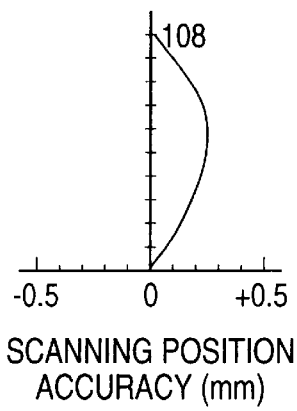
Figure 20A:
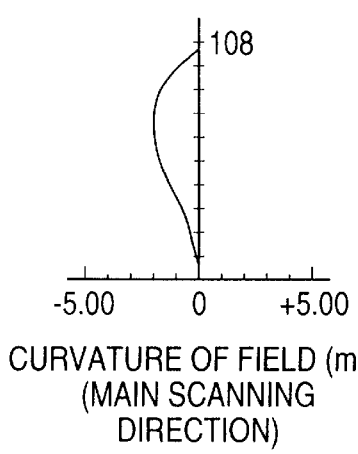
Figure 20B:
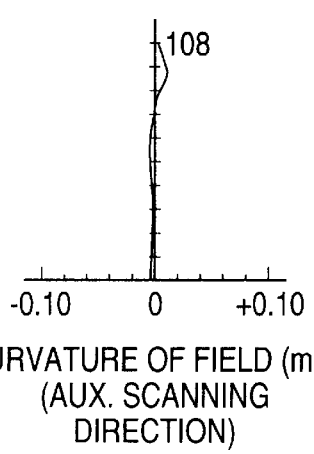
Figure 20C:
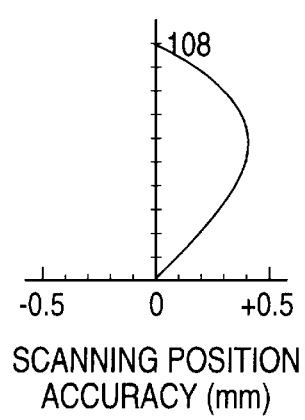
Figure 21:
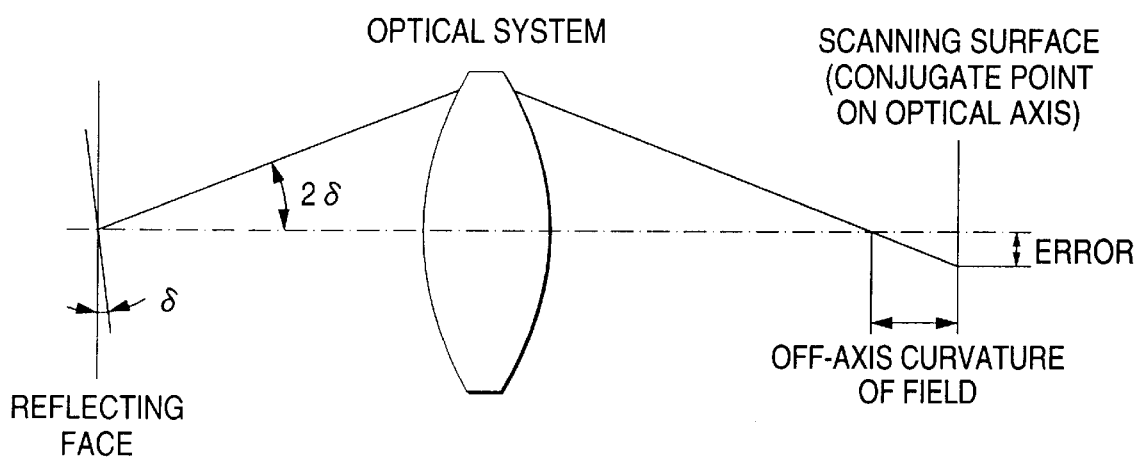
FIG. 21 shows an off-axis relationship between a conjugate relationship and the curvature of field.

In FIG. 2, the beam splitter 25 is provided to avoid such a case that the aspherical reflector 1 inclined from the optical axis would produce a reflected light beam that is bent into a bow-shape. Where the bending amount of a light beam reflected by the aspherical reflector 1 is within an allowable range, the beam splitter may be omitted as shown in FIGS. 3A and 3B in which the incident light flux and the reflected light flux are separated from each other by inclining the aspherical reflector 1 and the scanning light beam is directed to the scanning surface by an ordinary path-folding mirror 31.

Tables 1–4 show numerical data of light beam scanning optical systems of Examples 1–10 that use the aspherical reflector according to the first embodiment of the invention. A concave surface is given a negative radius of curvature.

TABLE 1

|  | Example 1 | Example 2 | Example 3 |
|---|---|---|---|
| $Y_0$ | 108 | 108 | 108 |
| Deflection angle (°) | ±50 | ±50 | ±50 |
| $R_m$ | 15 | 15 | 15 |
| A | $-1.6613 \times 10^{-3}$ | $-1.6879 \times 10^{-3}$ | $-1.7091 \times 10^{-3}$ |
| B | $-1.4582 \times 10^{-9}$ | $-2.1402 \times 10^{-9}$ | $-1.4166 \times 10^{-9}$ |
| C | $-4.583 \times 10^{-13}$ | $-3.441 \times 10^{-13}$ | $-3.023 \times 10^{-13}$ |
| D | 0 | 0 | 0 |
| E | 0 | 0 | 0 |
| $a_0$ | $-77.407$ | $-82.6909$ | $-86.6765$ |
| $a_2$ | $2.2786 \times 10^{-3}$ | $2.1621 \times 10^{-3}$ | $2.0903 \times 10^{-3}$ |
| $a_4$ | $-1.0677 \times 10^{-8}$ | $-5.3217 \times 10^{-9}$ | $-1.0932 \times 10^{-8}$ |
| $a_6$ | $9.0297 \times 10^{-13}$ | $3.9046 \times 10^{-13}$ | $6.1421 \times 10^{-13}$ |
| S | 208.433 | 235.373 | 267.771 |
| $L_m$ | 103 | 99 | 96 |
| $L_0$ | 165 | 170 | 175 |
| $L_m/L_0$ | 0.62 | 0.58 | 0.55 |
| $1/(2|A|Y_0)$ | 1.27 | 1.33 | 1.38 |
| $-2.43 L_m/L_0$ |  |  |  |

TABLE 2

|  | Example 4 | Example 5 | Example 6 |
|---|---|---|---|
| $Y_0$ | 108 | 108 | 108 |
| Deflection angle (°) | ±50 | ±50 | ±50 |
| $R_m$ | 15 | 15 | 15 |
| A | $-1.7540 \times 10^{-3}$ | $-1.8049 \times 10^{-3}$ | $-1.8698 \times 10^{-3}$ |
| B | $-1.0912 \times 10^{-9}$ | $-4.0215 \times 10^{-10}$ | $1.5852 \times 10^{-9}$ |
| C | $-2.669 \times 10^{-13}$ | $-2.384 \times 10^{-13}$ | $-2.642 \times 10^{-13}$ |
| D | 0 | 0 | 0 |
| E | 0 | 0 | 0 |
| $a_0$ | $-89.9564$ | $-92.2826$ | $-93.4836$ |
| $a_2$ | $2.0212 \times 10^{-3}$ | $1.9496 \times 10^{-3}$ | $1.8743 \times 10^{-3}$ |
| $a_4$ | $-1.6237 \times 10^{-8}$ | $-1.9994 \times 10^{-8}$ | $-2.4122 \times 10^{-8}$ |
| $a_6$ | $9.2864 \times 10^{-13}$ | $1.1231 \times 10^{-12}$ | $-1.0881 \times 10^{-12}$ |
| S | 322.002 | 411.638 | 618.682 |
| $L_m$ | 92 | 88 | 83 |
| $L_0$ | 180 | 185 | 190 |
| $L_m/L_0$ | 0.51 | 0.48 | 0.44 |
| $1/(2|A|Y_0)$ | 1.40 | 1.41 | 1.41 |
| $-2.43 L_m/L_0$ |  |  |  |

TABLE 3

|  | Example 7 | Example 8 | Example 9 |
|---|---|---|---|
| $Y_0$ | 108 | 108 | 108 |
| Deflection angle (°) | ±50 | ±50 | ±50 |
| $R_m$ | 15 | 15 | 15 |
| A | $-1.9574 \times 10^{-3}$ | $-2.0142 \times 10^{-3}$ | $-2.1261 \times 10^{-3}$ |
| B | $2.1956 \times 10^{-9}$ | $2.4703 \times 10^{-9}$ | $6.1530 \times 10^{-9}$ |
| C | $-2.465 \times 10^{-13}$ | $-2.385 \times 10^{-13}$ | $-3.857 \times 10^{-13}$ |
| D | 0 | 0 | 0 |
| E | 0 | 0 | 0 |
| $a_0$ | $-93.9910$ | $-94.1124$ | $-93.4197$ |
| $a_2$ | $1.8402 \times 10^{-3}$ | $1.8214 \times 10^{-3}$ | $1.7849 \times 10^{-3}$ |
| $a_4$ | $-3.0672 \times 10^{-8}$ | $-3.1333 \times 10^{-8}$ | $-5.0386 \times 10^{-8}$ |
| $a_6$ | $1.5206 \times 10^{-12}$ | $1.4030 \times 10^{-12}$ | $2.9590 \times 10^{-12}$ |
| S | 1343.144 | 4896.360 | $-942.775$ |
| $L_m$ | 79 | 77 | 72 |
| $L_0$ | 195 | 198 | 205 |
| $L_m/L_0$ | 0.43 | 0.39 | 0.35 |
| $1/(2|A|Y_0)$ | 1.38 | 1.35 | 1.32 |
| $-2.43 L_m/L_0$ |  |  |  |

TABLE 4

|  | Example 10 |
|---|---|
| $Y_0$ | 108 |
| Deflection angle (°) | ±50 |
| $R_m$ | 15 |
| A | $-2.2589 \times 10^{-3}$ |
| B | $9.5193 \times 10^{-9}$ |
| C | $-4.852 \times 10^{-13}$ |
| D | 0 |
| E | 0 |
| $a_0$ | $-91.2524$ |
| $a_2$ | $1.7669 \times 10^{-3}$ |
| $a_4$ | $-6.3837 \times 10^{-8}$ |
| $a_6$ | $3.7244 \times 10^{-12}$ |
| S | $-422.564$ |
| $L_m$ | 67 |
| $L_0$ | 210 |
| $L_m/L_0$ | 0.32 |
| $1/(2|A|Y_0)$ | 1.27 |
| $-2.43 L_m/L_0$ |  |

In Tables 1–4, $R_m$: radius of the inscribed circle of the polygon mirror (mm);

S: distance between the reflecting point of the deflection angle 0° and the incident beam converging point in the main scanning direction (mm);

$L_m$: distance between the reflecting point of the deflection angle 0° and the aspherical reflector (mm); and $L_0$: distance between the reflecting point of the deflection angle 0° and the scanning surface (mm).

FIGS. 4A and 4B through FIGS. 13A and 13B show the scanning position accuracy (i.e., the scanning speed invariability) and the curvature of field of Examples 1–10, respectively. It is seen that in each Example the scanning position accuracy and the curvature of field are corrected satisfactorily. As for the scanning position accuracy, the positive direction in each graph corresponds to the light beam advancing direction on the scanning surface.

As described above, to enable independent corrections of the optical characteristics in the main and auxiliary scanning planes, the shape in the main scanning plane needs to be defined as an equation not including X and the shape in the auxiliary scanning plane needs to be defined as a function of only Y. According to a second embodiment of the invention, this type of aspherical reflecting surface may be realized such that the non-circular arc Z(Y) in the main scanning direction is defined as $$Z(Y)=cY^2/[1+\{1-(K+1)c^2Y^2\}^{1/2}]+BY^4+CY^6+DY^8+EY^{10} \quad (4)$$

where c is a radius of curvature on the optical axis in the main scanning plane, and K, B, C, D and E are aspherical coefficients, the radius of curvature R(Y) in an auxiliary scanning plane is defined as $$R(Y)=a_0+a_2Y^2+a_4Y^4+a_6Y^6 \quad (2)$$

where $a_0$, $a_2$, $a_4$ and $a_6$ are coefficients, and the aspherical reflecting surface itself is defined as $$Z(X, Y)=Z(Y)+R(Y)-\{R(Y)^2-X^2\}^{1/2}. \quad (3)$$

In each of Examples 11–16 described below, the non-circular arc Z(Y) in the main scanning plane is a parabola.

Although in the example shown in FIG. 1 the radius $r_2'$ of curvature at the ends is set smaller than the radius $r_2$ of curvature that is obtained when the non-circular arc Z(Y) is rotated about the rotation symmetry axis 11, $r_2'$ may be set larger than $r_2$. The invention intends to determine the circular arc in the auxiliary scanning plane independently of the non-circular arc in the main scanning plane.

For example, where the deflector has a single reflecting face as in the case of a galvano mirror, there is no need of considering the unevenness in the pitch of scanning lines. Therefore, it is not necessary to establish a conjugate relationship in geometrical optics between the reflecting face of the deflector and the scanning surface. Even in this case, the invention is effective in correcting the optical characteristics in the main scanning direction and those in the auxiliary scanning direction.

Tables 5 and 6 show numerical data of light beam scanning optical systems of Examples 11–16 that use the aspherical reflector according to the second embodiment of the invention. These optical systems have the same configuration as the configuration shown in FIG. 2.

TABLE 5

|  | Example 11 | Example 12 | Example 13 |
|---|---|---|---|
| $R_m$ | 16 | 12 | 14 |
| $R_t$ (= 1/c) | 245 | 360 | 350 |
| K | −1 | −1 | −1 |
| B | 0 | 0 | 0 |
| C | 0 | 0 | 0 |
| D | 0 | 0 | 0 |
| E | 0 | 0 | 0 |
| $a_0$ | 90.055 | 130.042 | 123.747 |
| $a_2$ | −1.92088 × 10⁻³ | −1.19518 × 10⁻³ | −1.41505 × 10⁻³ |
| $a_4$ | 4.09466 × 10⁻⁸ | 0.65738 × 10⁻⁸ | 1.68553 × 10⁻⁸ |
| $a_6$ | −2.06345 × 10⁻¹² | −0.29315 × 10⁻¹² | −1.35683 × 10⁻¹² |
| S | 1940.882 | 1472.94 | 754.164 |
| $L_m$ | 74 | 110 | 112.5 |
| $L_0$ | 189 | 269 | 250 |
| $L_m/L_0$ | 0.39 | 0.41 | 0.45 |
| $L_m/R_t$ | 0.30 | 0.31 | 0.32 |
| Deflection angle (°) | ±52.6 | ±36.0 | ±38.0 |

TABLE 6

|  | Example 11 | Example 12 | Example 13 |
|---|---|---|---|
| $R_m$ | 14 | 15 | 14 |
| $R_t$ (= 1/c) | 450 | 330 | 250 |
| K | −1 | −1 | −1 |

TABLE 6-continued

|  | Example 11 | Example 12 | Example 13 |
|---|---|---|---|
| B | 0 | 0 | 0 |
| C | 0 | 0 | 0 |
| D | 0 | 0 | 0 |
| E | 0 | 0 | 0 |
| $a_0$ | 153.529 | 139.538 | 104.292 |
| $a_2$ | −1.08052 × 10⁻³ | −1.10003 × 10⁻³ | −1.56535 × 10⁻³ |
| $a_4$ | 0.65514 × 10⁻⁸ | 0.87830 × 10⁻⁸ | 2.67119 × 10⁻⁸ |
| $a_6$ | −3.10238 × 10⁻¹² | −0.32792 × 10⁻¹² | −1.42192 × 10⁻¹² |
| S | 835.438 | −755.932 | −670.000 |
| $L_m$ | 140 | 106 | 80 |
| $L_0$ | 310 | 310 | 230 |
| $L_m/L_0$ | 0.45 | 0.34 | 0.35 |
| $L_m/R_t$ | 0.31 | 0.32 | 0.32 |
| Deflection angle (°) | ±30.2 | ±34.8 | ±46.6 |

In Examples 11–16, $R_m$: radius of the inscribed circle of the polygon mirror (mm); and S: distance between the reflecting point of the deflection angle 0° and the incident beam converging point in the main scanning direction (mm).

FIGS. 15A–15C through FIGS. 20A–20C show the curvature of field and the scanning position accuracy (i.e., the scanning speed invariability) of Examples 11–16, respectively. It is seen that in each Example the curvature of field and the scanning position accuracy are corrected satisfactorily. In particular, the curvature of field in the auxiliary scanning direction is corrected almost completely. In each graph showing the scanning speed invariability, the scanning speed invariability is represented by the difference between the ideal scanning position (distance from the optical axis; proportional to the rotation angle of the polygon mirror) and the actual scanning position.

It is noted that the aspherical reflector and the light beam scanning optical system of the invention are not limited to those of the above embodiments, but may be modified in a variety of manners.

As described above, the invention can provide the aspherical reflector and the light beam scanning optical system which can perform high-density light beam scanning at constant speed.

Having the reflecting surface that assumes, in the main scanning plane, a non-circular arc represented by an equation including higher-odder aspherical coefficients, the aspherical reflector of the invention can satisfactorily correct the curvature of field in the main scanning direction and the scanning position accuracy. Further, since the radius of curvature in the auxiliary scanning plane is defined by a polynomial function of the distance from the optical axis, the optical characteristics in both of the main and auxiliary scanning directions can be corrected satisfactorily. The aspherical reflector has the face inclination correcting function. In addition, since the aspherical reflecting surface is smooth, superior optical characteristics can be obtained without impairing the light beam converging property.

By virtue of the use of the above aspherical reflector, the light beam scanning optical system of the invention has a smaller number of constituent parts and can realize a large deflection angle, and therefore can be made compact.

Since the light beam scanning optical system can provide superior optical characteristics irrespective of the location of the aspherical reflector, the optical characteristics are not degraded depending on the design of the light beam scanning optical system.

By forming the aspherical reflector with an amorphous polyolefin resin, which is superior in resistance to moisture absorption, it becomes less likely that the optical characteristics are deteriorated due to environmental changes. Further, since the aspherical reflector can establish an almost complete conjugate relationship in geometrical optics between the reflecting face of the deflector and the scanning surface, high-quality images can be produced even with a plastic polygon mirror that may have large face inclination.

What is claimed is:

1. An aspherical reflector which reflects a light beam that is focused in the vicinity of a deflecting face as a line image parallel with a main scanning plane and deflected by a deflector at a constant angular velocity so that a reflected light beam forms a spot image on a scanning surface and that the scanning surface is scanned with the reflected light beam at a constant speed, wherein the aspherical reflector has a reflecting surface which assumes, in the main scanning plane including the optical axis, a curve represented by $$Z(Y)=AY^2+BY^4+CY^6+DY^8+EY^{10}$$

where Z is a coordinate along the optical axis, Y is a coordinate in a direction that is perpendicular to the optical axis and is included in the main scanning plane, and A to E are coefficients satisfying A×C>0, and which assumes, at any position in a main scanning direction, a circular arc in an auxiliary scanning plane that is parallel with the optical axis and perpendicular to the main scanning plane, the circular arc establishing a conjugate relationship in geometrical optics between the deflecting face and the scanning surface.

2. The aspherical reflector according to claim 1, wherein the reflecting surface assumes, in the auxiliary scanning plane, a curve defined by a radius of curvature in the auxiliary scanning plane which is represented by $$R(Y)=a_0+a_2Y^2+a_4Y^4+a_6Y^6$$

where $a_0$ to $a_6$ are coefficients, and wherein the reflecting surface is represented by $$Z(X, Y)=Z(Y)+R(Y)-\{R(Y)^2-X^2\}^{1/2}$$

where X is a coordinate in a direction perpendicular to the main scanning plane.

3. The aspherical reflector according to claim 2, wherein the curve in the main scanning plane is represented by $$Z(Y)=cY^2/[1+\{1-(K+1)c^2Y^2\}^{1/2}]+BY^4+CY^6+DY^8+EY^{10}$$

where c is a radius of curvature on the optical axis in the main scanning plane, and K, B, C, D and E are aspherical coefficients.

4. The aspherical reflector according to claim 1, wherein the aspherical reflector is made of amorphous polyolefin.

5. A light beam scanning optical system comprising:
a light source for emitting a modulated light beam;
an optical system for forming a line image of the modulated light beam, the line image being parallel with a main scanning plane;
a deflector having a deflecting face in the vicinity of the line image, for deflecting the modulated light beam at a constant angular velocity; and
an aspherical reflector for reflecting the deflected light beam so as to scan a scanning surface with a reflected light beam at a constant speed, the aspherical reflector having a reflecting surface which assumes, in the main scanning plane including the optical axis, a curve represented by $$Z(Y)=AY^2+BY^4+CY^6+DY^8+EY^{10}$$

where Z is a coordinate along the optical axis, Y is a coordinate in a direction that is perpendicular to the optical axis and is included in the main scanning plane, and A to E are coefficients satisfying A×C>0, and which assumes, at any position in a main scanning direction, a circular arc in an auxiliary scanning plane that is parallel with the optical axis and perpendicular to the main scanning plane, the circular arc establishing a conjugate relationship in geometrical optics between the deflecting face and the scanning surface.

6. The light beam scanning optical system according to claim 5, wherein the reflecting surface assumes, in the auxiliary scanning plane, a curve defined by a radius of curvature in the auxiliary scanning plane which is represented by $$R(Y)=a_0+a_2Y^2+a_4Y^4+a_6Y^6$$

where $a_0$ to $a_6$ are coefficients, and wherein the reflecting surface is represented by $$Z(X, Y)=Z(Y)+R(Y)-\{R(Y)^2-X^2\}^{1/2}$$

where X is a coordinate in a direction perpendicular to the main scanning plane.

7. The light beam scanning optical system according to claim 6, wherein the curve in the main scanning plane is represented by $$Z(Y)=cY^2/[1+\{1-(K+1)c^2Y^2\}^{1/2}]+BY^4+CY^6+DY^8+EY^{10}$$

where c is a radius of curvature on the optical axis in the main scanning plane, and K, B, C, D and E are aspherical coefficients.

8. The light beam scanning optical system according to claim 7, wherein the light beam scanning optical system satisfies a condition $$0.3<L_m/L_0<0.7$$

where $L_m$ is a distance between a deflection point having a deflection angle 0° of the deflector and the aspherical reflector, and $L_0$ is a distance between the deflection point having the deflection angle 0° and the scanning surface.

9. The light beam scanning optical system according to claim 7, wherein the light beam scanning optical system satisfies a condition $$1.25<1/(2|A|Y_0)-2.43(L_m/L_0)<1.53$$

where $L_m$ is a distance between a deflection point having a deflection angle 0° of the deflector and the aspherical reflector, $L_0$ is a distance between the deflection point having the deflection angle 0° and the scanning surface, and $Y_0$ is a distance between a center of main scanning on the scanning surface and an end of the main scanning.

10. The light beam scanning optical system according to claim 6, wherein the light beam scanning optical system satisfies a condition $$0.3<L_m/L_0<0.7$$

where $L_m$ is a distance between a deflection point having a deflection angle 0° of the deflector and the aspherical reflector, and $L_0$ is a distance between the deflection point having the deflection angle 0° and the scanning surface.

11. The light beam scanning optical system according to claim 6, wherein the light beam scanning optical system satisfies a condition $$1.25 < 1/(2|A|Y_0) - 2.43(L_m/L_0) < 1.53$$

where $L_m$ is a distance between a deflection point having a deflection angle 0° of the deflector and the aspherical reflector, $L_0$ is a distance between the deflection point having the deflection angle 0° and the scanning surface, and $Y_0$ is a distance between a center of main scanning on the scanning surface and an end of the main scanning.

12. The light beam scanning optical system according to claim 6, wherein the curve of the aspherical reflector in the main scanning plane is a parabola, and wherein the light beam scanning optical system satisfies conditions $$0.3 < L_m/L_0 < 0.5, \text{ and } 0.25 < L_m/R_t < 0.35$$

where $L_m$ is a distance between a deflection point having a deflection angle 0° of the deflector and the aspherical reflector, $L_0$ is a distance between the deflection point having the deflection angle 0° and the scanning surface, and $R_t$ is a radius of curvature of the aspherical reflector on the optical axis in the main scanning plane.

13. The light beam scanning optical system according to claim 5, wherein the light beam scanning optical system satisfies a condition $$0.3 < L_m/L_0 < 0.7$$

where $L_m$ is a distance between a deflection point having a deflection angle 0° of the deflector and the aspherical reflector and $L_0$ is a distance between the deflection point having the deflection angle 0° and the scanning surface.

14. The light beam scanning optical system according to claim 5, wherein the light beam scanning optical system satisfies a condition $$1.25 < 1/(2|A|Y_0)31\ 2.43(L_m/L_0) < 1.53$$

where $L_m$ is a distance between a deflection point having a deflection angle 0° of the deflector and the aspherical reflector, $L_0$ is a distance between the deflection point having the deflection angle 0° and the scanning surface, and $Y_0$ is a distance between a center of main scanning on the scanning surface and an end of the main scanning.

15. The light beam scanning optical system according to claim 5, wherein the modulated light beam incident on the deflecting face of the deflector is convergent in the main scanning plane.

16. The light beam scanning optical system according to claim 5, wherein the modulated light beam incident on the deflecting face of the deflector is divergent in the main scanning plane.

17. The light beam scanning optical system according to claim 5, wherein the modulated light beam incident on the deflecting face of the deflector is parallel in the main scanning plane.

18. The light beam scanning optical system according to claim 5, wherein the curve of the aspherical reflector in the main scanning plane is a parabola, and wherein the light beam scanning optical system satisfies conditions $$0.3 < L_m/L_0 < 0.5, \text{ and } 0.25 < L_m/R_t < 0.35$$

where $L_m$ is a distance between a deflection point having a deflection angle 0° of the deflector and the aspherical reflector, $L_0$ is a distance between the deflection point having the deflection angle 0° and the scanning surface, and $R_t$ is a radius of curvature of the aspherical reflector on the optical axis in the main scanning plane.

* * * * *